(12) United States Patent
Nashida

(10) Patent No.: US 7,365,798 B2
(45) Date of Patent: Apr. 29, 2008

(54) VIDEO SIGNAL IDENTIFICATION DEVICE AND VIDEO SIGNAL IDENTIFICATION METHOD

(75) Inventor: Yukihiro Nashida, Tomachi (JP)

(73) Assignee: Seiko Epson Corporation, Tokyo (JP)

( * ) Notice: Subject to any disclaimer, the term of this patent is extended or adjusted under 35 U.S.C. 154(b) by 618 days.

(21) Appl. No.: 10/989,364

(22) Filed: Nov. 17, 2004

(65) Prior Publication Data

US 2005/0185093 A1 Aug. 25, 2005

(30) Foreign Application Priority Data

Dec. 3, 2003 (JP) ............................. 2003-404421

(51) Int. Cl.
*H04N 5/46* (2006.01)
*H04N 9/64* (2006.01)

(52) U.S. Cl. ...................... 348/558; 348/557; 348/554; 348/553; 348/555

(58) Field of Classification Search ................ 348/558, 348/557, 554, 553, 555, 467, 689; 345/603, 345/604

See application file for complete search history.

(56) References Cited

U.S. PATENT DOCUMENTS

| | | | | |
|---|---|---|---|---|
| 4,240,102 A | * | 12/1980 | Groeneweg ................ 348/558 |
| 4,933,749 A | * | 6/1990 | Van Lammeren et al. .. 348/558 |
| 5,192,997 A | * | 3/1993 | Imbert et al. ............... 348/558 |
| 5,371,552 A | * | 12/1994 | Brummette et al. ........ 348/697 |
| 5,661,527 A | * | 8/1997 | Ferguson .................... 348/558 |
| 5,798,801 A | * | 8/1998 | Skinner ....................... 348/645 |
| 5,990,971 A | * | 11/1999 | Nakai et al. ................ 348/558 |
| 6,057,889 A | * | 5/2000 | Reitmeier et al. .......... 348/555 |
| 6,064,494 A | * | 5/2000 | Hirota et al. ................ 358/1.9 |
| 6,154,257 A | * | 11/2000 | Honda et al. ............... 348/558 |
| 6,163,342 A | * | 12/2000 | Suzuki ....................... 348/364 |
| 6,329,981 B1 | * | 12/2001 | Lin et al. .................... 345/204 |
| 6,373,532 B1 | * | 4/2002 | Nakakuki ................... 348/659 |
| 6,377,310 B1 | * | 4/2002 | Okamoto et al. ........... 348/557 |
| 6,441,860 B1 | * | 8/2002 | Yamaguchi et al. ........ 348/555 |
| 6,552,751 B1 | * | 4/2003 | Shigeta ....................... 348/659 |

(Continued)

FOREIGN PATENT DOCUMENTS

EP 0 263 393 A2 4/1988

(Continued)

*Primary Examiner*—David Ometz
*Assistant Examiner*—Jean W. Désir
(74) *Attorney, Agent, or Firm*—Oliff & Berridge, PLC

(57) ABSTRACT

The procedure of the invention acquires a maximum RB value, which is a largest value of an R signal component and a B signal component, on the assumption that the signal format of an input video signal is an RGB signal, and obtains an RGB probability corresponding to a degree of largeness of the maximum RB value. The procedure also acquires a minimum color difference value, which is a smallest value of a color difference signal component, on the assumption that the signal format of the input video signal is a Y/color difference signal, and obtains a color difference probability corresponding to a degree of smallness of the minimum color difference value. The procedure compares the RGB probability with the color difference probability and thereby determines whether the signal format of the input video signal is the RGB signal or the Y/color difference signal. This arrangement effectively enhances the haccuracy of discrimination between the RGB signal and the Y/color difference signal.

12 Claims, 13 Drawing Sheets

U.S. PATENT DOCUMENTS

| | | | |
|---|---|---|---|
| 6,765,621 B2 * | 7/2004 | Okada | 348/558 |
| 6,927,746 B2 * | 8/2005 | Lee et al. | 345/3.2 |
| 6,937,756 B2 * | 8/2005 | Tanioka et al. | 382/162 |
| 6,947,096 B2 * | 9/2005 | Kumazawa | 348/488 |
| 6,950,147 B2 * | 9/2005 | Usui | 348/557 |
| 6,967,691 B2 * | 11/2005 | Keen | 348/695 |
| 6,972,803 B2 * | 12/2005 | Seth-Smith et al. | 348/558 |
| 7,009,641 B2 * | 3/2006 | Takahashi | 348/223.1 |
| 7,009,660 B2 * | 3/2006 | Kim | 348/558 |
| 7,119,847 B2 * | 10/2006 | Meiners | 348/558 |
| 7,187,409 B2 * | 3/2007 | Nakahira et al. | 348/243 |
| 7,212,246 B2 * | 5/2007 | Jung et al. | 348/448 |
| 2007/0070202 A1 * | 3/2007 | Kataoka | 348/194 |

FOREIGN PATENT DOCUMENTS

| | | |
|---|---|---|
| JP | A 07-087457 | 3/1995 |
| JP | A 10-312182 | 11/1998 |
| JP | A 11-155149 | 6/1999 |
| JP | A 2002-320243 | 10/2002 |

* cited by examiner

Fig.3

| VIDEO SOURCE | RESOLUTION MODE | HORIZONTAL FREQUENCY (LINE) | | VERTICAL FREQUENCY (FIELD) | | NUMBER OF VERTICAL LINES | SIGNAL FORMAT OF VIDEO SIGNAL |
|---|---|---|---|---|---|---|---|
| COMPUTER PICTURE SIGNALS | VGA | 31250 | ±1Hz | 59.5238 | ±0.01Hz | 525 | RGB |
| | SVGA | 37178 | ±1Hz | 60.3165 | ±0.01Hz | 628 | RGB |
| | XGA | 48363 | ±1Hz | 60.0038 | ±0.01Hz | 806 | RGB |
| | SXGA | 63981 | ±1Hz | 60.0197 | ±0.01Hz | 1066 | RGB |
| VIDEO PICTURE SIGNALS | 525i | 15734 | ±1Hz | 59.94 | ±0.01Hz | 525 | Y/Cb/Cr |
| | 525p | 31468.5 | ±1Hz | 59.94 | ±0.01Hz | 525 | Y/Cb/Cr |
| | 625i | 15625 | ±1Hz | 50.00 | ±0.01Hz | 625 | Y/Cb/Cr |
| | 750p | 44955 | ±1Hz | 59.94 | ±0.01Hz | 750 | Y/Cb/Cr |
| | 1125i | 33716.25 | ±1Hz | 59.94 | ±0.01Hz | 1125 | Y/Cb/Cr |

Fig.5

| MAXIMUM RB VALUE | RGB PROBABILITY(%) |
|---|---|
| 0 ~ 128 | 0 |
| 129 ~ 144 | 10 |
| 145 ~ 160 | 30 |
| 161 ~ 176 | 50 |
| 177 ~ 192 | 70 |
| 193 ~ 208 | 90 |
| 209 ~ 255 | 100 |

Fig.7

| MINIMUM COLOR DIFFERENCE VALUE | COLOR DIFFERENCE PROBABILITY(%) |
|---|---|
| 128 ~ 255 | -10 |
| 96 ~ 127 | 0 |
| 80 ~ 95 | 20 |
| 64 ~ 79 | 40 |
| 48 ~ 63 | 70 |
| 32 ~ 47 | 90 |
| 0 ~ 31 | 100 |

Fig.8

| | R,G,B =0~64 | R,G,B =0~128 | R,G,B =0~153 | R,G,B =0~191 | R,G,B =0~255 |
|---|---|---|---|---|---|
| MINIMUM COLOR DIFFERENCE VALUE | 128 | 128 | 128 | 128 | 128 |
| MAXIMUM RB VALUE | 64 | 128 | 153 | 191 | 255 |
| RGB PROBABILITY | 0% | 0% | 30% | 70% | 100% |
| COLOR DIFFERENCE PROBABILITY | -10% | -10% | -10% | -10% | -10% |
| RESULT OF DISCRIMINATION | RGB | RGB | RGB | RGB | RGB |

Fig.9

| | Y = 0~255<br>Cr,Cb<br>=64~192<br>(=128±64) | Y = 0~255<br>Cr,Cb<br>=32~224<br>(=128±64) | Y = 0~255<br>Cr,Cb<br>=0~255<br>(=128 $^{+127}_{-128}$) |
|---|---|---|---|
| MINIMUM COLOR DIFFERENCE VALUE | 64 | 32 | 0 |
| MAXIMUM RB VALUE | 64 | 96 | 128 |
| RGB PROBABILITY | 0% | 0% | 0% |
| COLOR DIFFERENCE PROBABILITY | 40% | 90% | 100% |
| RESULT OF DISCRIMINATION | COLOR DIFFERENCE | COLOR DIFFERENCE | COLOR DIFFERENCE |

Fig.10

| | BLACK & WHITE IMAGE 70% Y=0~179 Cr,Cb =128±0 | BLACK & WHITE IMAGE 60% Y=0~154 Cr,Cb =128±0 | BLACK & WHITE IMAGE 50% Y=0~128 Cr,Cb =128±0 | BLACK & WHITE IMAGE 40% Y=0~102 Cr,Cb =128±0 | BLACK & WHITE IMAGE 30% Y=0~77 Cr,Cb =128±0 | BLACK & WHITE IMAGE 20% Y=0~51 Cr,Cb =128±0 |
|---|---|---|---|---|---|---|
| MINIMUM COLOR DIFFERENCE VALUE | 128 | 128 | 128 | 128 | 128 | 128 |
| MAXIMUM RB VALUE | 0 | 0 | 0 | 0 | 0 | 0 |
| RGB PROBABILITY | 0% | 0% | 0% | 0% | 0% | 0% |
| COLOR DIFFERENCE PROBABILITY A | -10% | -10% | -10% | -10% | -10% | -10% |
| RESULT OF DISCRIMINATION | RGB | RGB | RGB | RGB | RGB | RGB |

Fig.11

| G RATE(%) | COLOR DIFFERENCE PROBABILITY B(%) |
|---|---|
| 0 ~ 9 | -30 |
| 10 ~ 19 | -20 |
| 20 ~ 29 | -10 |
| 30 ~ 39 | 0 |
| 40 ~ 49 | 20 |
| 50 ~ 59 | 50 |
| 60 ~ 100 | 100 |

Fig.12

| | BLACK & WHITE IMAGE 70% Y=0~179 Cr,Cb =128±0 | BLACK & WHITE IMAGE 60% Y=0~154 Cr,Cb =128±0 | BLACK & WHITE IMAGE 50% Y=0~128 Cr,Cb =128±0 | BLACK & WHITE IMAGE 40% Y=0~102 Cr,Cb =128±0 | BLACK & WHITE IMAGE 30% Y=0~77 Cr,Cb =128±0 | BLACK & WHITE IMAGE 20% Y=0~51 Cr,Cb =128±0 |
|---|---|---|---|---|---|---|
| MINIMUM COLOR DIFFERENCE VALUE | 128 | 128 | 128 | 128 | 128 | 128 |
| MAXIMUM RB VALUE | 0 | 0 | 0 | 0 | 0 | 0 |
| RGB PROBABILITY | 0% | 0% | 0% | 0% | 0% | 0% |
| COLOR DIFFERENCE PROBABILITY A | -10% | -10% | -10% | -10% | -10% | -10% |
| G RATE | 70% | 60% | 50% | 40% | 30% | 20% |
| COLOR DIFFERENCE PROBABILITY B | 100% | 100% | 50% | 20% | 0% | -10% |
| A+B | 90% | 90% | 40% | 10% | -10% | -20% |
| RESULT OF DISCRIMINATION | RGB→COLOR DIFFERENCE | RGB→COLOR DIFFERENCE | RGB→COLOR DIFFERENCE | RGB→COLOR DIFFERENCE | RGB | RGB |

Fig.13

| | R,G,B =0~64 | R,G,B =0~128 | R,G,B =0~153 | R,G,B =0~191 | R,G,B =0~255 |
|---|---|---|---|---|---|
| MINIMUM COLOR DIFFERENCE VALUE | 128 | 128 | 128 | 128 | 128 |
| MAXIMUM RB VALUE | 64 | 128 | 153 | 191 | 255 |
| RGB PROBABILITY | 0% | 0% | 30% | 70% | 100% |
| COLOR DIFFERENCE PROBABILITY A | -10% | -10% | -10% | -10% | -10% |
| G RATE | 0% | 0% | 0% | 0% | 0% |
| COLOR DIFFERENCE PROBABILITY B | -30% | -30% | -30% | -30% | -30% |
| A+B | -40% | -40% | -40% | -40% | -40% |
| RESULT OF DISCRIMINATION | RGB | RGB | RGB | RGB | RGB |

VIDEO SIGNAL IDENTIFICATION DEVICE AND VIDEO SIGNAL IDENTIFICATION METHOD

BACKGROUND OF THE INVENTION

1. Field of the Invention

The present invention relates to a technique of determining whether the signal format of each input video signal is an RGB signal or a Y/color difference signal.

2. Description of the Related Art

Direct-view video display devices (also called 'image display devices) like liquid-crystal displays (LCD) and plasma displays (PDP), as well as projection video display devices (projectors) including liquid crystal display (LCD) panels (may simply be referred to as 'liquid crystal panels') or digital micro-mirror devices (referred to as 'DMD', trademark by Texas Instruments, Inc.) are typically capable of displaying images expressed by various video signal systems.

The video signals are classified by the picture source, for example, signals output from computers (hereafter referred to as 'computer picture signals') and signals used for conventional televisions and hi-visions (hereafter referred to as video picture signals). The video signals are also classified by the signal format, for example, an RGB signal consisting of three primary color signal components R (red), G (green), and B (blue) and a Y/color difference signal (hereafter may simply be referred to as 'color difference signal') consisting of a Y (luminance) signal component and two color difference signal components Cr(R-Y) and Cb(B-Y). The video signals are further classified by the resolution of the image expressed by the video signal. For example, the computer picture signals has VGA, SVGA, XGA, and SXGA resolution modes, while the video picture signals has 525i, 525p, 625i, 750p, and 1125i resolution modes.

Adjustment of the processing conditions according to the type of the input video signal is thus required to display images expressed by various types of video signals by one video display device. The video display device accordingly has a function of automatically identifying the type of the input video signal.

A typical video signal identification method detects information on synchronizing signals having different settings corresponding to different types of video signals, for example, settings of a horizontal frequency and a vertical frequency of synchronizing signals representing the timings of the video signal and a number of vertical lines representing the number of horizontal synchronizing signals (hereafter referred to as the 'synchronizing signal-relating information'), and identifies the type of the video signal, based on the detected synchronizing signal-relating information (hereafter referred to as the 'synchronizing signal-based identification method'). This synchronizing signal-based identification method is disclosed, for example, in Japanese Patent Laid-Open Gazettes No. 7-87457 and No. 10-312182.

The synchronizing signal-based identification method, however, has difficulties in accurate discrimination between specific types of video signals. For example, the video signal in the VGA mode as one of the computer picture signals and the video signal in the 525p mode as one of the video picture signals have the identical number of vertical lines and substantially similar settings of the frequency of the horizontal synchronizing signal (horizontal frequency) and the frequency of the vertical synchronizing signal (vertical frequency). Accurate discrimination between these video signals is relatively difficult by taking into account the measurement accuracy of the horizontal frequency and the vertical frequency.

A known technique of discrimination between the video signal in the VGA mode and the video signal in the 525p mode utilizes the fact that the video signal in the VGA mode is an RGB signal and that the video signal in the 525p mode is a Y/color difference signal and determines whether the video signal is the Y/color difference signal or the RGB signal (hereafter referred to as the 'method of RGB/color difference signal discrimination'). The method of RGB/color difference signal discrimination is disclosed, for example, in Japanese patent Laid-Open Gazettes No. 11-155149 and No. 2002-320243.

The prior art method of RGB/color difference signal discrimination utilizes the fact that the Y/color difference signal has a signal level lower than the clamp level but the RGB signal does not have any signal level lower than the clamp level, when the video signal is clamped at the pedestal level. This the prior art RGB/color difference signal discrimination method accordingly compares each video signal with a preset value that is a little lower than the clamp level and determines that the video signal is the Y/color difference signal in the presence of the signal level lower than the preset value.

The prior art method of RGB/color difference signal discrimination may, however, cause wrong discrimination, for example, due to the presence of noise superposed on the video signal. The lower level of the video signal generally leads to the higher potential for wrong discrimination.

SUMMARY OF THE INVENTION

The object of the invention is thus to eliminate the drawbacks of the prior art technique discussed above and to provide a technique of enhancing the accuracy of determination of whether the signal format of each video signal is an RGB signal or a Y/color difference signal.

In order to attain at least part of the above and the other related objects, the present invention is directed to a video signal identification device that determines whether a signal format of an input video signal is an RGB signal or a Y/color difference signal. The video signal identification device includes: a clamp circuit that clamps the input video signal to adjust a pedestal level of the input video signal to a predetermined signal level and outputs the clamped video signal; an AD conversion circuit that receives the video signal output from the clamp circuit; a video signal-relating information acquisition module that acquires a preset piece of video signal-relating information, in response to an output video signal from the AD conversion circuit; and a video signal identification module that obtains an RGB probability, which represents a possibility that the signal format of the input video signal is the RGB signal, and a color difference probability, which represents a possibility that the signal format of the input video signal is the Y/color difference signal, based on the preset piece of video signal-relating information acquired by the video signal-relating information acquisition module, and compares the RGB probability with the color difference probability to determine whether the signal format of the input video signal is the RGB signal or the Y/color difference signal.

The video signal identification device of the invention compares the RGB probability with the color difference probability and determines whether the signal format of the video signal is the RGB signal or the Y/color difference signal. Compared with the prior art technique of RGB/color difference signal discrimination, the arrangement of the invention significantly lowers the potential for wrong discrimination and enhances the accuracy of the discrimination.

In one preferable embodiment of the video signal identification device of the invention, the video signal identification module sets the predetermined signal level in the clamp circuit to a substantially minimum level in a dynamic range of the AD conversion circuit on the assumption that the signal format of the input video signal is the RGB signal, causes the video signal-relating information acquisition module to acquire a maximum RB value, which is a largest value of an R signal component and a B signal component output from the AD conversion circuit, as the preset piece of video signal-relating information, and obtains the RGB probability corresponding to a degree of largeness of the acquired maximum RB value. The video signal identification module also sets the predetermined signal level of a color difference signal component in the clamp circuit to a substantially center level in the dynamic range of the AD conversion circuit on the assumption that the signal format of the input video signal is the Y/color difference signal, causes the video signal-relating information acquisition module to acquire a minimum color difference value, which is a smallest value of the color difference signal component output from the AD conversion circuit, as the preset piece of video signal-relating information, and obtains the color difference probability corresponding to a degree of smallness of the acquired minimum color difference value.

This arrangement facilitates acquisition of the RGB probability and the color difference probability.

In another preferable embodiment of the video signal identification device of the invention, the video signal identification module sets the predetermined signal level in the clamp circuit to a substantially minimum level in a dynamic range of the AD conversion circuit on the assumption that the signal format of the input video signal is the RGB signal, causes the video signal-relating information acquisition module to acquire a maximum RB value, which is a largest value of an R signal component and a B signal component output from the AD conversion circuit, as the preset piece of video signal-relating information, and obtains the RGB probability corresponding to a degree of largeness of the acquired maximum RB value. The video signal identification module also sets the predetermined signal level of a color difference signal component in the clamp circuit to a substantially center level in the dynamic range of the AD conversion circuit on the assumption that the signal format of the input video signal is the Y/color difference signal, causes the video signal-relating information acquisition module to acquire a minimum color difference value, which is a smallest value of the color difference signal component output from the AD conversion circuit, as the preset piece of video signal-relating information, and obtains a first color difference probability corresponding to a degree of smallness of the acquired minimum color difference value. The video signal identification module causes the video signal-relating information acquisition module to acquire the maximum RB value and a maximum G value, which is a largest value of a G signal component, as the preset piece of video signal-relating information, and obtains a second color difference probability corresponding to a degree of largeness of the maximum G value to the maximum RB value. The video signal identification module sums up the first color difference probability and the second color difference probability to a total color difference probability, which is to be compared with the RGB probability.

In still another preferable embodiment of the video signal identification device of the invention, the video signal identification module sets the predetermined signal level in the clamp circuit to a substantially minimum level in a dynamic range of the AD conversion circuit on the assumption that the signal format of the input video signal is the RGB signal, causes the video signal-relating information acquisition module to acquire a maximum RB value, which is a largest value of an R signal component and a B signal component output from the AD conversion circuit, as the preset piece of video signal-relating information, and obtains the RGB probability corresponding to a degree of largeness of the acquired maximum RB value. The video signal identification module also sets the predetermined signal level of a color difference signal component in the clamp circuit to a substantially center level in the dynamic range of the AD conversion circuit on the assumption that the signal format of the input video signal is the Y/color difference signal, causes the video signal-relating information acquisition module to acquire a minimum color difference value, which is a smallest value of the color difference signal component output from the AD conversion circuit, as the preset piece of video signal-relating information, and obtains a first color difference probability corresponding to a degree of smallness of the acquired minimum color difference value. The video signal identification module causes the video signal-relating information acquisition module to acquire the minimum color difference value, and to acquire a minimum Y value, which is a smallest value of the Y signal component, as the preset piece of video signal-relating information by setting the predetermined signal level of a Y signal component to the substantially minimum level in the dynamic range of the AD conversion circuit, and obtains a second color difference probability corresponding to a degree of smallness of the minimum Y value to the minimum color difference value. The video signal identification module sums up the first color difference probability and the second color difference probability to a total color difference probability, which is to be compared with the RGB probability.

Either arrangement of these embodiments further heightens the accuracy of the color difference probability, thus more effectively lowering the potential for wrong discrimination and enhancing the accuracy of the discrimination.

The technique of the invention is actualized by any of:
(1) the video signal identification device of the various arrangements discussed above and corresponding video signal identification methods;
(2) video signal processing devices and video display devices including the video signal identification device;
(3) computer programs to attain these devices and methods; and
(4) recording media in which computer programs to attain these devices and methods are recorded.

In the applications of the invention as the computer programs and the recording media in which the computer programs are recorded, the invention may be given as whole programs to control the operations of the above devices or as partial programs to exert only the characteristic functions of the invention. Available examples of the recording media include flexible disks, CD-ROMs, DVD-ROMs/RAMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

These and other objects, features, aspects, and advantages of the present invention will become more apparent from the following detailed description of the preferred embodiments with the accompanied drawings.

BRIEF DESCRIPTION OF THE DRAWINGS

FIG. 3 shows an example of video signal list information representing various types of video signals;

FIG. 5 shows information on RGB probability to maximum RB value;

FIG. 7 shows information on color difference probability to minimum color difference value;

FIG. 8 shows a result of discrimination based on a comparison between the RGB probability and the color difference probability when the video signal is an RGB signal;

FIG. 9 shows a result of discrimination based on a comparison between the RGB probability and the color difference probability when the video signal is a Y/color difference signal;

FIG. 10 shows a case of wrong discrimination by the RGB/color difference signal discrimination of the first embodiment where the video signal, which is actually the Y/color difference signal, is mistakenly detected as the RGB signal;

FIG. 11 shows information on color difference probability to G rate;

FIG. 12 shows a result of discrimination based on a comparison between the RGB probability and the total color difference probability (A+B) when the video signal is a Y/color difference signal representing a black and white image; and FIG. 13 shows a result of discrimination based on a comparison between the RGB probability and the total color difference probability (A+B) when the video signal is an RGB signal.

DESCRIPTION OF THE PREFERRED EMBODIMENTS

Some modes of carrying out the invention are discussed below as preferred embodiments in the following sequence:

A. First Embodiment

A.1 General Configuration of Video Display Device
A.2 Video Signal Identification Process
A.2.1 Video Signal Identification Based on Synchronizing Signal-Relating Information
A.2.2 Identification End Judgment
A.2.3 Video Signal Identification Based on Result of RGB/Color Difference Signal Discrimination
A.3 RGB/Color Difference Signal Discrimination
A.3.1 Acquisition of RGB Probability
A.3.2 Acquisition of Color Difference Probability
A.3.3 RGB/Color Difference Signal Discrimination Based on Comparison between RGB Probability and Color Difference Probability B.
B. RGB/Color Difference Signal Discrimination in Second Embodiment
B.1 Acquisition of Color Difference Probability B
B.2 RGB/Color Difference Signal Discrimination Based on Comparison between RGB Probability and Total Color Difference Probability (A+B)

C. Modifications

A. First Embodiment

A.1 General Configuration of Video Display Device

Figure 1:
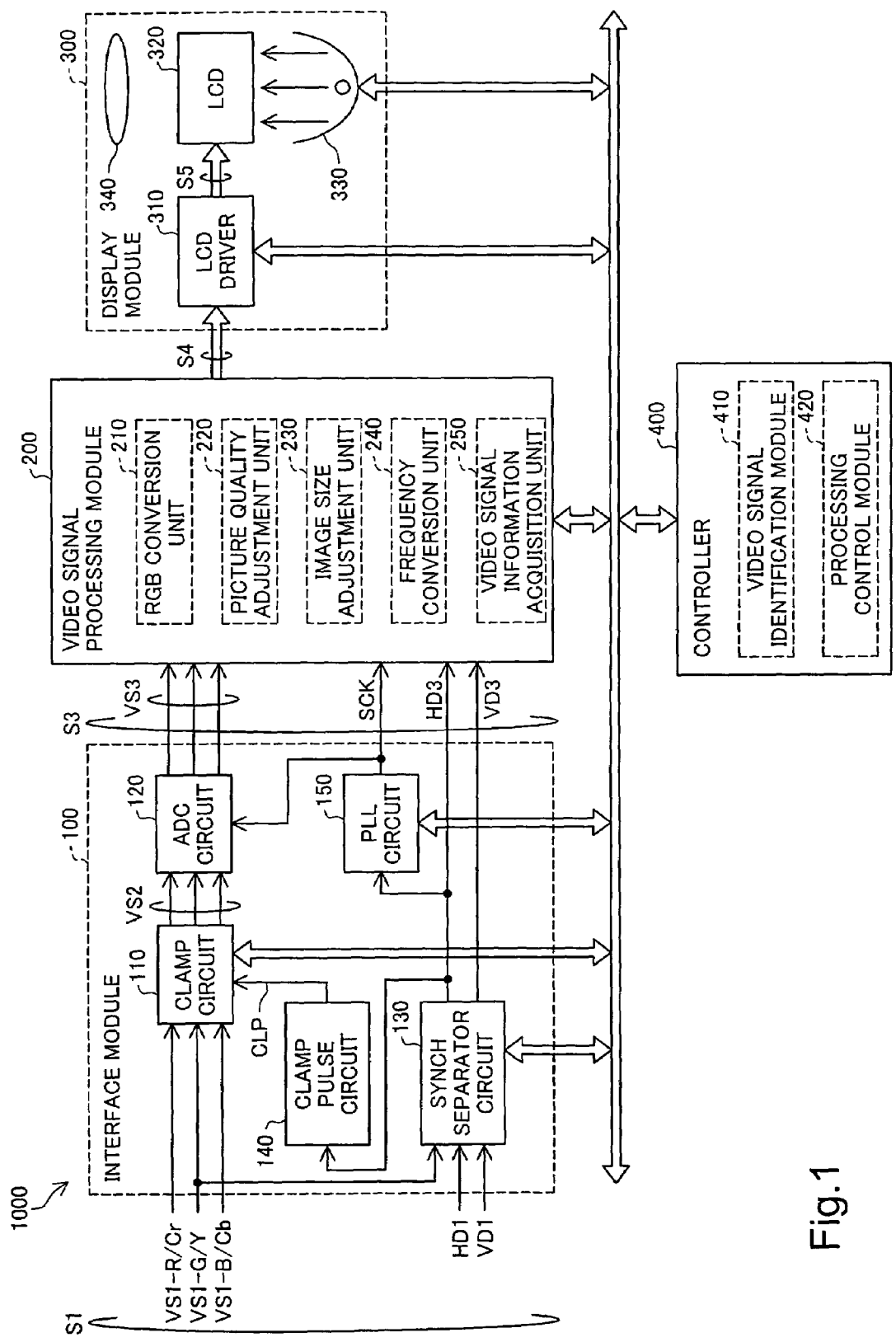
FIG. 1 is a block diagram showing essential part of a projector as a first embodiment of a video display device of the invention.

FIG. 1 is a block diagram showing essential part of a projector 1000 as a first embodiment of a video display device of the invention. The projector 1000 includes an interface module 100, a video signal processing module 200, a display module 300, and a controller 400. The interface module 100 converts a video signal VS1 included in an input signal S1 into a video signal VS3 to be processible by the video signal processing module 200, and outputs a signal S3 including the converted video signal VS3 to the video signal processing module 200. The video signal processing module 200 makes an image expressed by the video signal VS3 subjected to various series of processing, converts the video signal VS3 into a video signal VS4 to be displayable by the display module 300, and outputs a signal S4 including the converted video signal VS4 to the display module 300. The display module 300 displays an image according to the input signal S4. The controller 400 is connected to the respective module blocks via control lines and controls the operations of the respective module blocks.

The input signal S1 may include either an RGB signal or a Y/color difference signal. Namely the video signal VS1 included in the input signal S1 may be a component video signal consisting of three signal components R, G, and B or a component video signal consisting of three signal components Y, Cr, and Cb. Either the RGB signal or the Y/color difference signal is input as the video signal VS1 into the interface module 100. The pair of the R signal component and the Cr signal component, the pair of the G signal component and the Y signal component, and the pair of the B signal component and the Cb signal component respectively share identical signal lines for the video signal input into the interface module 100. As a synchronizing signal of the input signal S1, a horizontal synchronizing signal may be superposed on the G signal component or the Y signal component or may be included as an independent signal HD1 in the input signal S1. Similarly a vertical synchronizing signal may also be superposed on the G signal component or the Y signal component or may be included as an independent signal VD1 in the input signal S1. The vertical synchronizing signal may be superposed on the horizontal synchronizing signal.

In the description hereafter, the R, G, and B signal components of the video signal VS1 included in the input signal S1 are shown as VS1-R, VS1-G, and VS1-B. Similarly the Y, Cr, and Cb signal components are shown as VS1-Y, VS1-Cr, and VS1-Cb. When no discrimination between the R signal component and the Cr signal component, between the G signal component and the Y signal component, and between the B signal component and the Cb signal component is required, the three signal components of the video signal VS1 may be shown as VS1-R/Cr, VS1-G/Y, and VS1-B/Cb. When no discrimination is required between the video signal VS1 and the synchronizing signal included in the input signal S1, the input signal S1 may be called the video signal S1. These representations are also applied to other signals S2 to S5.

The interface module 100 includes a clamp circuit 110, an AD conversion (ADC) circuit 120, a sync separator circuit 130, a clamp pulse circuit 140, and a PLL circuit 150.

The sync separator circuit 130 detects whether the independent horizontal synchronizing signal HD1 and the independent vertical synchronizing signal VD1 are included in the input signal S1 or the horizontal synchronizing signal and the vertical synchronizing signal are superposed on the video signal component VS1-G/Y. When the synchronizing signals are superposed on the video signal component VS1-G/Y, the sync separator circuit 130 extracts the superposed synchronizing signals from the video signal component VS1-G/Y and outputs the extracted synchronizing signals as a horizontal synchronizing signal HD3 and a vertical synchronizing signal VD3. The results of the detection are given to the controller 400 via the control line. When the input signal S1 includes the independent horizontal synchronizing signal HD1 and the independent vertical synchronizing signal VD1, these independent synchronizing signals are output directly as the horizontal-synchronizing signal HD3 and the vertical synchronizing signal VD3.

The clamp circuit 110 clamps the three video signal components VS1-R/Cr, VS1-G/Y, and VS1-B/Cb at a pedestal level (black level) in response to a clamp pulse signal CLP, and supplies the clamped video signal components as VS2-R/Cr, VS2-G/Y, and VS2-B/Cb to the ADC circuit 120. In the case where the video signal VS1 is an RGB signal, offset adjustment is carried out to adjust the clamped direct current level to a minimum level ($L_L$) in an input dynamic range of the ADC circuit 120. In the case where the video signal VS1 is a Y/color difference signal, on the other hand, offset adjustment is carried out to adjust the clamped direct current level to a center level ($L_C$) in the input dynamic range of the ADC circuit 120 with regard to the Cr and Cb signal components, while the same offset adjustment as that of the RGB signal is carried out with regard to the Y signal component. Switchover of the offset adjustment is controlled by clamp control information output from the controller 400.

The clamp pulse circuit 140 generates a clamp pulse signal CLP representing an operation timing of the clamp circuit 110, in response to the horizontal synchronizing signal HD3 output from the sync separator circuit 130.

The PLL circuit 150 generates a sampling clock signal SCK representing an operation timing of the ADC circuit 120, in response to the horizontal synchronizing signal HD3 output from the sync separator circuit 130. The frequency of the generated sampling clock signal SCK is regulated by clock control information output from the controller 400.

The ADC circuit 120 samples and quantizes the three video signal components VS2-R/Cr, VS2-G/Y, and VS2-B/Cb input from the clamp circuit 110 in response to the sampling clock signal SCK, and outputs the sampled and quantized video signal components as three digital video signal components VS3-R/Cr, VS3-G/Y, and VS3-B/Cb. In the structure of this embodiment, an 8-bit AD converter circuit is applied to the ADC circuit 120.

The digital video signal components VS3-R/Cr, VS3-G/Y, and VS3-B/Cb, the sampling clock signal SCK, the horizontal synchronizing signal HD3, and the vertical synchronizing signal VD3 output from the interface module 100 are given as the input signal S3 to the video signal processing module 200.

The clamp pulse circuit 140 and the PLL circuit 150 may be included in the video signal processing module 200, instead of in the interface module 100.

The video signal processing module 200 executes diverse series of processing, which correspond to an RGB conversion unit 210, a picture quality adjustment unit 220, an image size adjustment unit 230, a frequency conversion unit 240, and a video signal information acquisition unit 250, to convert the input signal S3 into the input signal S4 given to the display module 300.

When the video signal VS3 included in the input signal S3 is a Y/color difference signal, the RGB conversion unit 210 functions to convert the Y/color difference signal into an RGB signal. Execution or non-execution of the RGB conversion by the RGB conversion unit 210 is controlled by RGB conversion control information output from the controller 400. The RGB conversion control information depends upon the result of identification of the video signal as discussed later.

The picture quality adjustment unit 220 functions to adjust the settings of various picture quality-affecting factors, for example, brightness, contrast, sharpness, and noise filter, with respect to the image data expressed by the input video signal. The picture quality adjustment executed by the picture quality adjustment unit 220 is controlled by picture quality adjustment information output from the controller 400.

The image size adjustment unit 230 functions to adjust the settings of various image size-affecting factors, for example, expansion, contraction, and correction of keystone distortion, with respect to the image data expressed by the input video signal. The image size adjustment executed by the image size adjustment unit 230 is controlled by image size information output from the controller 400.

The frequency conversion unit 240 functions to convert a refresh timing of the video signal, which is defined by the frequencies of the synchronizing signals, to a timing suppliable to the display module 300. Conversion of the refresh timing executed by the frequency conversion unit 240 is controlled by refresh timing information output from the controller 400. The refresh timing information depends upon the result of identification of the video signal as discussed later.

The video signal information acquisition unit 250 acquires video signal-relating information and synchronizing signal-relating information used for subsequent identification of the video signal, for example, information on a maximum value and a minimum value of the input video signal and information on cycles and frequencies of the input synchronizing signals and on a blanking period. The acquired pieces of information are transmitted to the controller 400 via the control line.

The cycle (or the frequency) of the horizontal synchronizing signal is readily measured, for example, by counting the number of reference clocks of a known cycle or frequency included in one cycle of the horizontal synchronizing signal. The cycle (or the frequency) of the vertical synchronizing signal is readily measured by counting the number of the horizontal synchronizing signals included in one cycle of the vertical synchronizing signal, that is, the number of vertical lines.

The display module 300 includes a liquid crystal panel (LCD) driver 310, a liquid crystal panel 320 as a light valve, a lighting unit 330, and a projection optical system 340.

The LCD driver 310 generates a driving signal S5 for driving the liquid crystal panel 320, in response to the input signal S4 from the video signal processing module 200.

The liquid crystal panel 320 functions as a light valve (light modulator) that modulates illumination light emitted from the lighting unit 330 in response to the driving signal S5 from the LCD driver 310 to form an image.

The projection optical system 340 emits the illumination light modulated by the liquid crystal panel 320 as light representing an image (image light) toward a screen (not shown) to project an image on the screen.

The liquid crystal panel 320 includes three liquid crystal panels corresponding to the three primary colors R, G, and B, although not being specifically illustrated. The lighting unit 330 accordingly has a color light separation optical system for separating source light into three color image light components. The projection optical system 340 has a composite optical system and a projection lens for combining the three color image light components into composite image light representing a color image. These optical systems may have any of the known structures of the conventional projectors and are thus not described concretely.

The controller 400 includes a CPU, a RAM, and a ROM (not shown) and controls the operations of the interface module 100, the video signal processing module 200, and the display module 300 to control the image display by the projector 1000.

The controller 400 executes software programs stored in the non-illustrated ROM to function as a video signal identification module 410 and a processing control module 420. The video signal identification module 410 identifies the type of the externally input video signal, based on the information acquired by the video signal information acquisition unit 250 in the video signal processing module 200. The processing control module 420 specifies adequate settings of control information based on the result of identification of the video signal and controls the operations of the clamp circuit 110, the ADC circuit 120, and the PLL circuit 150 of the interface module 100 and the RGB conversion unit 210 and the frequency conversion unit 240 of the video signal processing module 200. The identification of the video signal is described later in detail.

The structure of the projector shown in FIG. 1 mainly shows the characteristic part of the invention and naturally includes diversity of other functions included in the general projector.

A.2 Video Signal Identification Process

Figure 2:
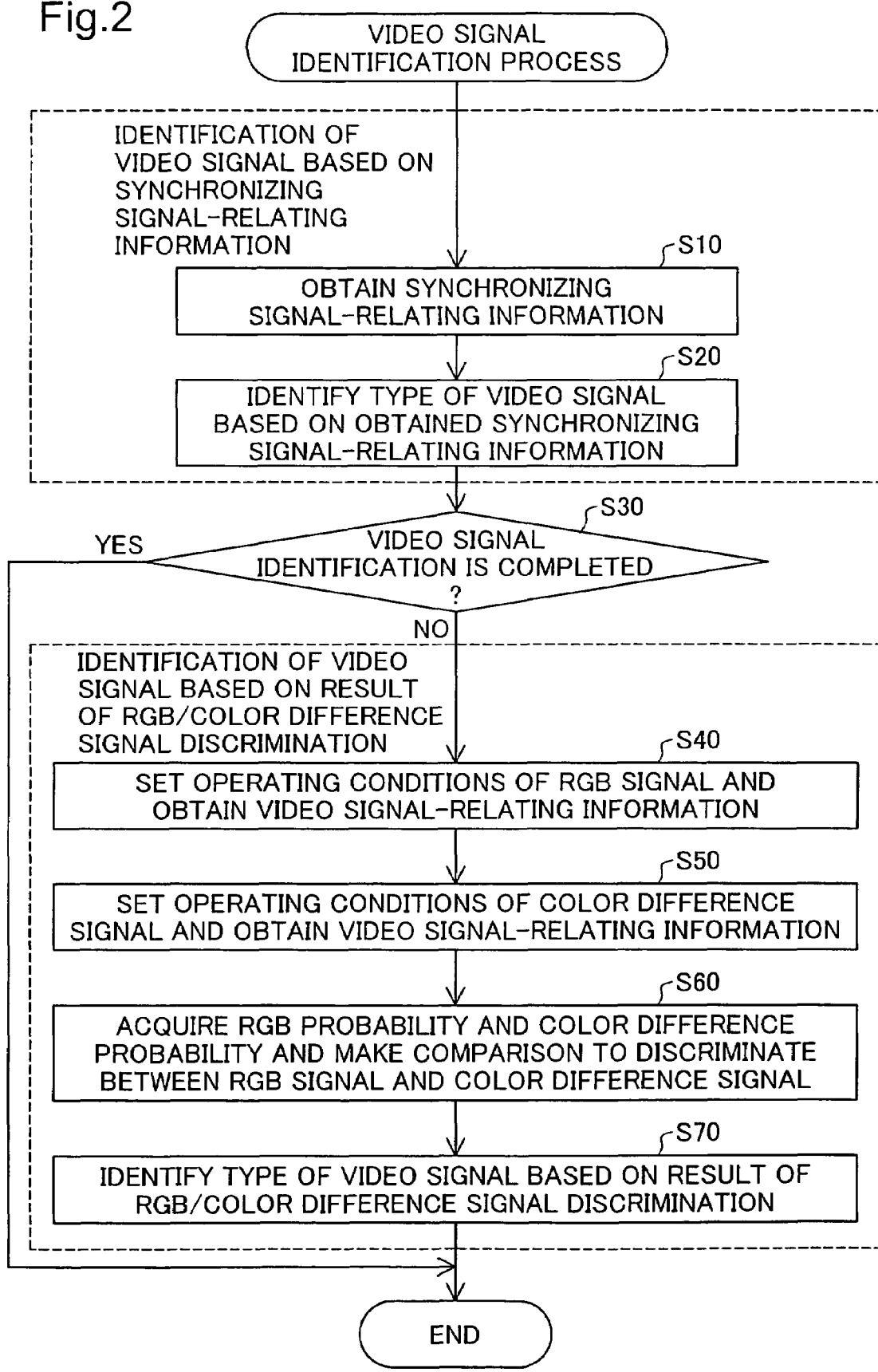
FIG. 2 is a flowchart showing a video signal identification process.

FIG. 2 is a flowchart showing a video signal identification process. In response to activation of the projector 1000 for projection of an image and subsequent input of a video signal, the video signal identification module 410 shown in FIG. 1 sequentially executes a process of identification of video signal based on synchronizing signal-relating information, a process of identification end judgment, and a process of identification of video signal based on result of RGB/color difference signal discrimination as shown in the flowchart of FIG. 2.

A.2.1 Identification of Video Signal Based on Synchronizing Signal-Relating Information The process of identification of video signal based on synchronizing signal-relating information first obtains the synchronizing signal-relating information at step S10. The video signal identification module 410 instructs the video signal information acquisition unit 250 of the video signal processing module 200 to acquire the synchronizing signal-relating information regarding, for example, the frequency of the horizontal synchronizing signal, the number of the vertical lines, and the frequency of the vertical synchronizing signal. The video signal information acquisition unit 250 acquires the synchronizing signal-relating information in response to the instruction and supplies the acquired synchronizing signal-relating information to the video signal identification module 410. The video signal identification module 410 accordingly obtains the synchronizing signal-relating information. The process of identification of video signal based on synchronizing signal-relating information then identifies the type of the video signal based on the obtained pieces of the synchronizing signal-relating information at step S20.

There are various distinguishable types of video signals as discussed below. FIG. 3 shows an example of video signal list information representing various types of video signals.

The video signals are classified into plural groups by the video source. In the illustrated example of FIG. 3, the video signals are classified by the video source into two groups, that is, computer picture signals and video picture signals, as described previously.

The video signals are also classified by the resolution of the image expressed by the video signal. In the illustrated example of FIG. 3, the computer picture signals has VGA, SVGA, XGA, and SXGA resolution modes, while the video picture signals has 525i, 525p, 625i, 750p, and 1125i resolution modes.

The video signals in each resolution mode are further classified by the horizontal frequency, the vertical frequency, and the number of vertical lines. In the illustrated example of FIG. 3, for the simplicity of explanation, one resolution mode has only one set of the horizontal frequency, the vertical frequency, and the number of vertical lines.

The video signals in each resolution mode are also classified by the signal format, for example, components signals and composite signals. The component signals include RGB signals and Y/color difference signals (for example, Y/Cb/Cr signal and Y/PbPr signal). In the illustrated example of FIG. 3, for the simplicity of explanation, the computer picture signals are all RGB signals and the video picture signals are all Y/color difference signals.

The classification of FIG. 3 is only an example. The video signals may also be classified by diversity of other parameters, for example, the polarity of the synchronizing signal and the pulse width of the synchronizing signal. Such classification is, however, not essential for identification of the video signal described below and is thus not explained concretely.

The video signal list information shown in FIG. 3 is stored in the form of a table or a database in a specific memory area (not shown) of the controller 40. The identification of the video signal is carried out by referring to the stored video signal list information.

At step S20, the video signal identification module 410 refers to the video signal list information and identifies the type of the video signal corresponding to the obtained pieces of the synchronizing signal-relating information. For example, the SVGA, XGA, and SXGA resolution modes of the computer picture signals and 525i, 625i, 750p, and 1125i resolution modes of the video picture signals are distinguishable by at least one of the horizontal frequency, the vertical frequency, and the number of vertical lines given as the synchronizing signal-relating information, as shown in FIG. 3. The video signal identification module 410 identifies the type of the video signal in this manner.

A.2.2 Identification End Judgment

After the process of identification of video signal based on synchronizing signal-relating information at steps S10 and S20, it is determined at step S30 whether the video signal identification process is to be terminated or continued.

When the process of identification of video signal based on synchronizing signal-relating information succeeds in identifying the type of the video signal and completes the video signal identification, the video signal identification module 410 determines termination of the video signal identification process at step S30 and exits from the video signal identification process.

When the process of identification of video signal based on synchronizing signal-relating information fails to identify the type of the video signal and does not complete the video signal identification, on the other hand, the video signal identification module 410 determines continuation of the video signal identification process at step S30 and proceeds to the next step in the video signal identification process.

As shown in FIG. 3, the computer picture signal in the VGA resolution mode and the video picture signal in the 525p resolution mode have an identical number of vertical lines 525 and very close values of the horizontal frequency and the vertical frequency. Due to this similarity, the process of identification of video signal based on synchronizing signal-relating information often fails to determine whether the video signal is the VGA mode or the 525p mode.

The horizontal frequency and the vertical frequency in each type of the video signal generally have some allowable margins to absorb the potential error of measurement. For example, the horizontal frequency in the VGA mode has an allowable margin of 1 to 2 kHz relative to a specified value 31250±1 Hz, whereas the horizontal frequency in the 525p mode has an allowable margin of 1 to 2 kHz relative to a specified value 31468.5±1 Hz. The horizontal frequency ranges of these two modes accordingly have some overlap. The vertical frequency ranges of the two modes similarly have some overlap. It may thus be difficult to determine whether the video signal is the computer picture signal in the VGA resolution mode or the video picture signal in the 525p resolution mode, based on any of the parameters, the horizontal frequency, the vertical frequency, and the number of vertical lines.

As shown in FIG. 3, the video signal in the VGA resolution mode and the video signal in the 525p resolution mode have different signal formats. The video signal in the VGA resolution mode is an RGB signal, whereas the video signal in the 525p resolution mode is a Y/color difference signal.

When the video signal identification module 410 fails to identify the type of the video signal and does not complete the video signal identification, the video signal identification process discriminates between the RGB signal and the Y/color difference signal (hereafter simply referred to as 'RGB/color difference signal discrimination') and identifies the type of the video signal based on the result of such discrimination.

A.2.3 Video Signal Identification Based on Result of RGB/Color Difference Signal Discrimination The process of identification of video signal based on result of RGB/color difference signal discrimination first assumes that the signal format of the video signal is the RGB signal and obtains the video signal-relating information of the R, G, and B signal components at step S40. The video signal identification module 410 supplies the clamp control information corresponding to the RGB signal to the clamp circuit 110 and actuates the clamp circuit 110 under the operating conditions of the RGB signal.

The process of identification of video signal based on result of RGB/color difference signal discrimination then assumes that the signal format of the video signal is the Y/color difference signal (Y/Cb/Cr signal) and obtains the video signal-relating information of the Y, Cb, and Cr signal components at step S50. The video signal identification module 410 supplies the clamp control information corresponding to the Y/color difference signal to the clamp circuit 110 and actuates the clamp circuit 110 under the operating conditions of the Y/color difference signal.

At step S60, the video signal identification module 40 obtains a probability that the signal format of the video signal is the RGB signal (hereafter referred to as the 'RGB probability') and a probability that the signal format of the video signal is the Y/color difference signal (hereafter referred to as the 'color difference probability'), compares the RGB probability with the color difference probability, and determines whether the signal format of the video signal is the RGB signal or the Y/color difference signal.

At subsequent step S70, the video signal identification module 40 identifies the type of the video signal, based on the result of the RGB/color difference signal discrimination executed at step S60. For example, it is assumed that the process of identification of video signal based on synchronizing signal-relating information at steps S10 and S20 fails to determine whether the video signal is the VGA resolution mode or the 525p resolution mode shown in FIG. 3. The video signal identification module 40 identifies the video signal in the VGA resolution mode when the discrimination result shows that the signal format of the video signal is the RGB signal. The video signal identification module 40 identifies the video signal in the 525p resolution mode, on the other hand, when the discrimination result shows that the signal format of the video signal is the Y/color difference signal.

On completion of the identification of video signal based on result of RGB/color difference signal discrimination, the video signal identification process of FIG. 2 is terminated.

After the successful identification of video signal based on synchronizing signal-relating information or the successful identification of video signal based on result of RGB/color difference signal discrimination, the processing control module 420 sets control information corresponding to the identified type of the video signal in the relevant functional blocks, which accordingly start the operations according to the control information.

The video signal identification process is characteristic of the process of RGB/color difference signal discrimination that compares the RGB probability with the color difference probability to determine whether the signal format of the video signal is the RGB signal or the Y/color difference signal. The method of RGB/color difference signal discrimination is described in detail.

A.3 RGB/Color Difference Signal Discrimination

The RGB/color difference signal discrimination process of the first embodiment sequentially carries out acquisition of the RGB probability, acquisition of the color difference probability, and comparison between the RGB probability and the color difference probability to determine whether the signal format of the video signal is the RGB signal or the Y/color difference signal.

A.3.1 Acquisition of RGB Probability

Figure 4:
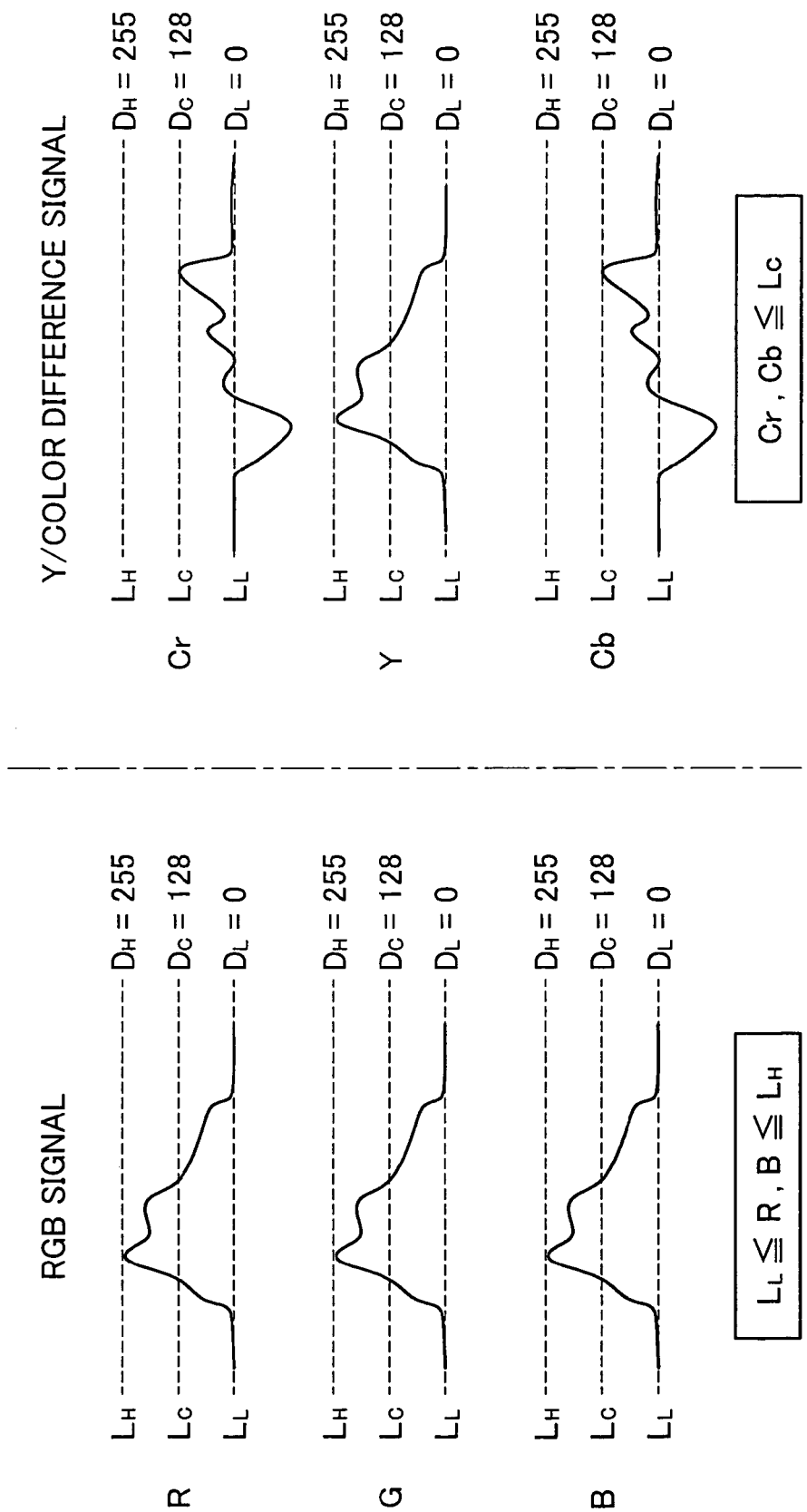
FIG. 4 shows video signals output from a clamp circuit actuated under the operating conditions of an RGB signal.

FIG. 4 shows video signals output from the clamp circuit 110 (see FIG. 1) actuated under the operating conditions of the RGB signal. The left half of the drawing shows the RGB signal, and the right half shows the Y/color difference signal.

In the case of the RGB signal, the respective minimum levels of the R, G, and B signal components are clamped to the minimum level $L_L$ in the input dynamic range of the ADC circuit 120 (see FIG. 1). The variable ranges of the respective R, G, and B signal components are thus between the minimum level $L_L$ and a maximum level $L_H$ in the input dynamic range of the ADC circuit 120. Data included in the digital R and B signal components output from the ADC circuit 120 take the value in a range of a minimum value $D_L=0$ to a maximum value $D_H=255$, when the ADC circuit 120 is the 8-bit AD conversion circuit.

In the case of the Y/color difference signal (Y/Cb/Cr signal), the respective center levels of the Cr signal component assumed as the R signal component and the Cb signal component assumed as the B signal component are clamped to the minimum level $L_L$ in the input dynamic range of the ADC circuit 120. The variable ranges of the Cr signal component assumed as the R signal component and the Cb signal component assumed as the B signal component are thus on and below the center level $L_C$ in the input dynamic range of the ADC circuit 120. Data included in the digital Cr and Cb signal components, which are assumed as the R and B signal components and are output from the ADC circuit 120, take the value in a range of the minimum value $D_L=0$ to a center value $D_C=128$. The Y signal component assumed as the G signal component has the same behavior as that of the RGB signal, and data included in the digital Y signal component output from the ADC circuit 120 take the value in a range of the minimum value $D_L=0$ to the maximum value $D_H=255$.

When the maximum value of either the R signal component or the B signal component (hereafter referred to as the 'maximum RB value') is greater than the center value $D_C=128$ on the assumption that the signal format of the video signal is the RGB signal, the video signal is expected to be the RGB signal.

In the actual state, however, noise is superposed on the input signal. The clamp level of the clamp circuit 110 and the input dynamic range of the ADC circuit 120 naturally have some variations, for example, due to setting errors. Even when the video signal is actually the Y/color difference signal, there is still some possibility that the value specified as the maximum value of either the Cr signal component assumed as the R signal component or the Cb signal component assumed as the B signal component is greater than the center value $D_C=128$. Namely it is possible that the video signal is not the RGB signal but the Y/color difference signal, even when the specified maximum RB value is greater than the center value $D_C=128$.

The greater maximum RB value than the center value $D_C=128$ gives the higher probability that the video signal is the RGB signal.

The RGB/color difference signal discrimination method of this embodiment provides information regarding the RGB probability relative to the maximum RB value, which is set in such a manner that the greater maximum RB value than the center value $D_C=128$ gives the higher RGB probability (hereafter referred to as the 'information on RGB probability to maximum RB value'). The video signal identification module 410 extracts the maximum RB value of the input video signal from the video signal-relating information obtained at step S40 in the flowchart of FIG. 2 and refers to the information on RGB probability to maximum RB value to acquire the RGB probability relative to the extracted maximum RB value.

FIG. 5 shows the information on RGB probability to maximum RB value. The information on RGB probability to maximum RB value of FIG. 5 is only an example and is not restrictive in any sense. The information on RGB probability to maximum RB value is experimentally determined and set corresponding to each possible type of the input video signal.

The information on RGB probability to maximum RB value is typically stored in a non-illustrated memory area of the controller 400 and is referred to at the step of acquisition of the RGB probability.

A.3.2 Acquisition of Color Difference Probability

Figure 6:
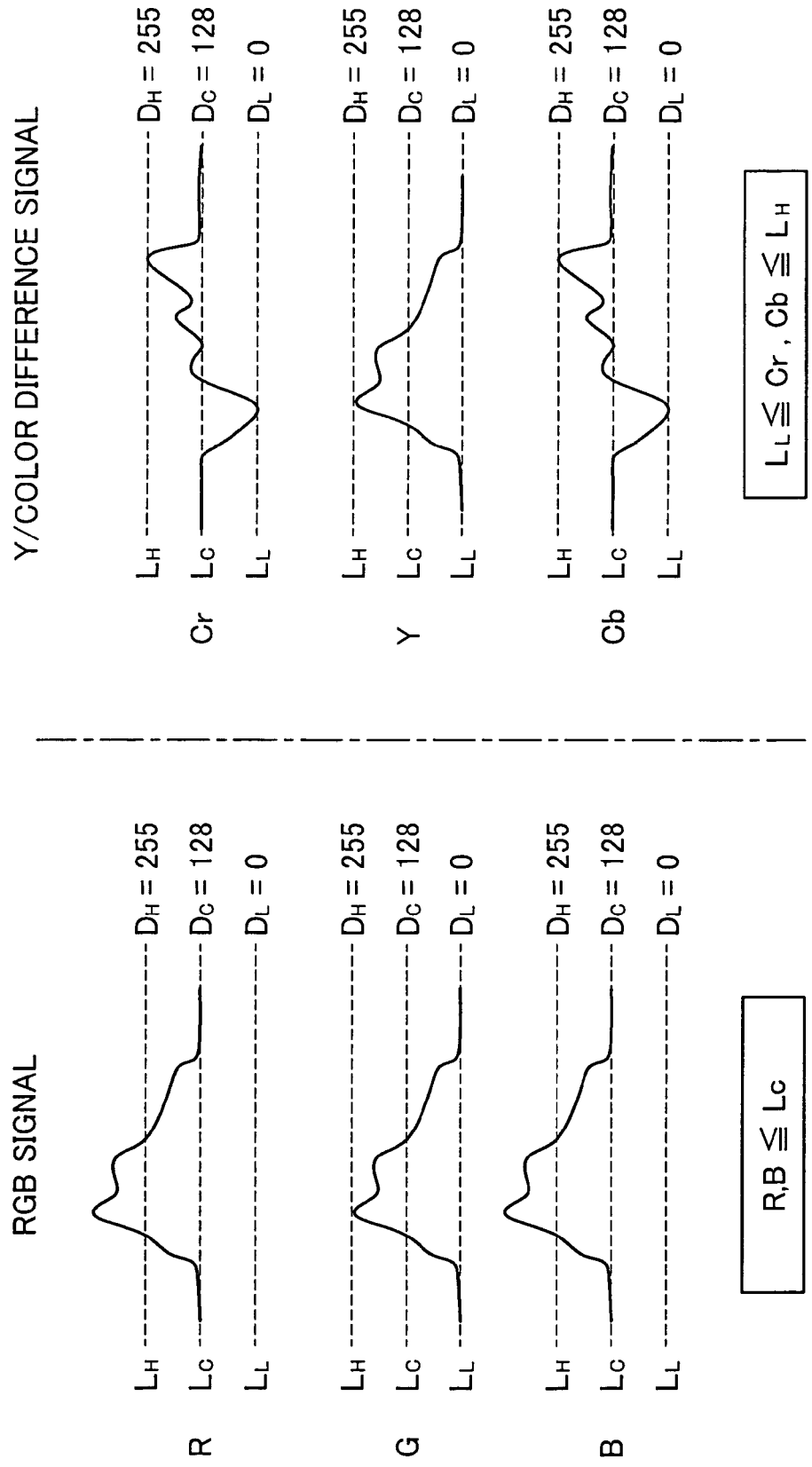
FIG. 6 shows video signals output from the clamp circuit actuated under the operating conditions of a Y/color difference signal.

FIG. 6 shows video signals output from the clamp circuit 110 actuated under the operating conditions of the Y/color difference signal. The left half of the drawing shows the RGB signal, and the right half shows the Y/color difference signal.

In the case of the Y/color difference signal (Y/Cb/Cr signal), the respective center levels of the Cr and Cb signal components are clamped to the center level $L_C$ in the input dynamic range of the ADC circuit 120 (see FIG. 1). The variable ranges of the Cr and Cb signal components are thus between the minimum level $L_L$ and the maximum level $L_H$ across the center level $L_C$ in the input dynamic range of the ADC circuit 120. Data included in the digital Cr and Cb signal components output from the ADC circuit 120 take the value in a range of a minimum value $D_L=0$ to a maximum value $D_H=255$.

In the case of the RGB signal, the respective minimum levels of the R signal component assumed as the Cr signal component and the B signal component assumed as the Cb signal component are clamped to the center level $L_C$ in the input dynamic range of the ADC circuit 120. The variable ranges of the R signal component assumed as the Cr signal component and the B signal component assumed as the Cb signal component are thus on and greater than the center level $L_C$ in the input dynamic range of the ADC circuit 120. Data included in the digital R and B signal components, which are assumed as the Cr and Cb signal components and are output from the ADC circuit 120, take the value in a range of a center value $D_C=128$ to the maximum value $D_H=255$.

When the minimum value of either the Cr signal component or the Cb signal component (hereafter referred to as the 'minimum color difference value') is smaller than the center value $D_C=128$ on the assumption that the signal format of the video signal is the Y/color difference signal, the video signal is expected to be the Y/color difference signal.

As described above with regard to the RGB probability, noise is superposed on the actual input signal. The clamp level of the clamp circuit 110 and the input dynamic range of the ADC circuit 120 naturally have some variations, for example, due to setting errors. Even when the video signal is actually the RGB signal, there is still some possibility that the value specified as the minimum value of either the R signal component assumed as the Cr signal component or the B signal component assumed as the Cb signal component is smaller than the center value $D_C=128$. Namely it is possible that the video signal is not the Y/color difference signal but the RGB signal, even when the specified minimum color difference value is smaller than the center value $D_C=128$.

The smaller minimum color difference value than the center value $D_C=128$ gives the higher probability that the video signal is the Y/color difference signal.

The RGB/color difference signal discrimination method of this embodiment provides information regarding the color difference probability relative to the minimum color difference value, which is set in such a manner that the smaller minimum color difference value than the center value $D_C=128$ gives the higher color difference probability (hereafter referred to as the 'information on color difference probability to minimum color difference value'). The video signal identification module 410 extracts the minimum color difference value of the input video signal from the video signal-relating information obtained at step S50 in the flowchart of FIG. 2 and refers to the information on color difference probability to minimum color difference value to acquire the color difference probability relative to the extracted minimum color difference value.

FIG. 7 shows the information on color difference probability to minimum color difference value. The information on color difference probability to minimum color difference value of FIG. 7 is only an example and is not restrictive in any sense. The information on color difference probability to minimum color difference value is experimentally determined and set corresponding to each possible type of the input video signal.

The information on color difference probability to minimum color difference value is typically stored in a non-illustrated memory area of the controller 400 and is referred to at the step of acquisition of the color difference probability.

A.3.3 RGB/Color Difference Signal Discrimination Based on Comparison between RGB Probability and Color Difference Probability The result of the RGB/color difference signal discrimination depends upon the result of the comparison between the RGB probability and the color difference probability determines. The higher RGB probability shows that the video signal is the RGB signal, while the higher color difference probability shows that the video signal is the Y/color difference signal.

FIG. 8 shows a result of discrimination based on a comparison between the RGB probability and the color difference probability when the video signal is an RGB signal. This illustrated example has five variable ranges of the R, G, and B signal components, 0 to 64, 0 to 128, 0 to 153, 0 to 191, and 0 to 255 as 8-bit values.

The maximum RB value sequentially changes as 64, 128, 153, 191, to 255 in the respective ranges with a variation in maximum value of the RGB signal. The information on RGB probability to maximum RB value (see FIG. 5) gives the settings of the RGB probability in the respective ranges to 0%, 0%, 30%, 70%, and 100%.

The minimum color difference value is fixed to the center value $D_C=128$ in all the five ranges regardless of a variation of the R signal component assumed as the Cr signal component or the B signal component assumed as the Cb signal component, as long as potential noise and other errors are neglected. The information on color difference probability to minimum color difference value (see FIG. 7) gives the settings of the color difference probability to −10% in any of the five ranges.

All the results of comparison between the RGB probability and the color difference probability in the respective ranges show the higher RGB probability than the color difference probability. The video signal is thus accurately identified as the RGB signal in any of these five ranges.

FIG. 9 shows a result of discrimination based on a comparison between the RGB probability and the color difference probability when the video signal is a Y/color difference signal. This illustrated example has three variable ranges of the Cr and Cb signal components, 64 to 192, 32 to 224, and 0 to 255 as 8-bit values, while the variable range of the Y signal component is 0 to 255 as 8-bit values.

The minimum color difference value sequentially changes as 64, 32, to 0 in the respective ranges with a variation in minimum value of either the Cr signal component or the Cb signal component. The information on color difference probability to minimum color difference value (see FIG. 7) gives the settings of the color difference probability to 40%, 90%, and 100% in the respective ranges.

The maximum RB value sequentially changes as 64, 96, to 128 in the respective ranges with a variation in maximum value of the Cr signal component assumed as the R signal component or the Cb signal component assumed as the B signal component. All these settings of the maximum RB value are not greater than the center value $D_C=128$. The information on RGB probability to maximum RB value (see FIG. 5) gives the settings of the RGB probability to 0% in any of the three ranges.

All the results of comparison between the RGB probability and the color difference probability in the respective ranges show the higher color difference probability than the RGB probability. The video signal is thus accurately identified as the Y/color difference signal in any of these three ranges.

When the RGB probability is identical with the color difference probability, one of the probabilities is selected according to a previous setting.

As described above, the RGB/color difference signal discrimination process of the embodiment compares the RGB probability with the color difference probability to determine whether the signal format of the video signal is the RGB signal or the Y/color difference signal. The RGB probability shows the possibility of the RGB signal, and the color difference probability shows the possibility of the Y/color difference signal. As described previously, the prior art RGB/color difference signal discrimination method compares each video signal with a preset value that is a little lower than the clamp level and discriminates between the RGB signal and the Y/color difference signal, based on the presence or the absence of the signal level lower than the preset value. Compared with this prior art method, the method of the embodiment significantly lowers the potential for wrong discrimination and enhances the accuracy of the discrimination.

B. RGB/Color Difference Signal Discrimination in Second Embodiment

The general configuration of a video display device and the general flow of a video signal identification process of a second embodiment are identical with those of the first embodiment and are thus not specifically described here. The following description regards a different flow of the RGB/color difference signal discrimination process executed in the second embodiment.

Like the process of the first embodiment, the RGB/color difference signal discrimination process of the second embodiment compares the RGB probability with the color difference probability to determine whether the signal format of the video signal is the RGB signal or the Y/color difference signal. The process of the second embodiment, however, acquires another color difference probability (hereafter referred to as the 'color difference probability B'), which is different from the color difference probability acquired in the process of the first embodiment (hereafter referred to as the 'color difference probability A'). The process of the second embodiment then compares the RGB probability with a total color difference probability (A+B) that is the sum of the two color difference probabilities A and B.

Acquisition of the RGB probability in the process of the second embodiment is identical with that of the first embodiment and is thus not specifically described here. The following describes acquisition of the color difference probability B and comparison between the RGB probability and the total color difference probability (A+B).

B.1 Acquisition of Color Difference Probability B

The color difference probability A of the first embodiment is acquired by referring to the information on color difference probability to minimum color difference value set in such a manner that the smaller minimum color difference value than the center value $D_C$=128 gives the higher color difference probability on the assumption that the video signal is the Y/color difference signal.

When the minimum value of the color difference signal component, that is, either the Cr signal component or the Cb signal component, is approximate to or not less than the center value $D_C$, it is difficult to accurately discriminate between the RGB signal and the Y/color difference signal. Namely the accuracy of discrimination is lowered.

FIG. 10 shows a case of wrong discrimination by the RGB/color difference signal discrimination of the first embodiment where the video signal, which is actually the Y/color difference signal, is mistakenly detected as the RGB signal. In this illustrated example, the video signal is a Y/color difference signal representing a black and white image with a variation in luminance at six levels, 70%, 60%, 50%, 40%, 30%, and 20%.

In the case of the Y/color difference signal representing the black and white image, the Y signal component varies with a variation in luminance. The Cr signal component and the Cb signal component are, however, fixed to the center value $D_C$=128. The minimum color difference value is thus fixed to the center value $D_C$=128 in any ranges, as long as noise and other errors are neglected. The information on color difference probability to minimum color difference value (see FIG. 7) gives the settings of the color difference probability A to −10% in any ranges.

The maximum RB value is fixed to the minimum value $D_L$=0 in any ranges, as long as noise and other errors are neglected. The information on RGB probability to maximum RB value (see FIG. 5) gives the settings of the RGB probability to 0% in any ranges.

In all the ranges, the RGB probability is 0% and the color difference probability A is −10%. The result of the comparison between the RGB probability and the color difference probability A thus shows the higher RGB probability than the color difference probability A. The signal format of the input video signal, which is actually the Y/color difference signal, is thus mistakenly detected as the RGB signal.

The problem of wrong discrimination also arises in the video signal of the RGB signal format, when the maximum RB value is smaller than the center value $D_C$=128 as shown in FIG. 8. The minimum color difference value is fixed to the center value $D_C$=128 regardless of the variable range of the RGB signal, as long as noise and other errors are neglected. The information on color difference probability to minimum color difference value (see FIG. 7) gives the settings of the color difference probability to −10% in any ranges. Due to the presence of the noise and other errors, however, there is a possibility that the specified minimum color difference value is less than the center value $D_C$=128. The color difference probability is accordingly not −10% but is equal to or greater than 0%. When the maximum RB value is smaller than 128, the information on RGB probability to maximum RB value (see FIG. 5) gives the settings of the RGB probability to 0%. The input video signal, which is actually the RGB signal, may be detected mistakenly as the Y/color difference signal, when the maximum RB value is smaller than 128.

As described previously with reference to FIG. 4, when the video signal output from the clamp circuit 110 (see FIG. 1) is the Y/color difference signal on the assumption of the RGB signal, the variable range of the Y signal component is between the minimum level $L_L$ and the maximum level $L_H$. The variable ranges of the Cr and the Cb signal components are, on the other hand, on or below the center level $L_C$.

When the Y/color difference signal is assumed as the RGB signal, there is a high possibility that the maximum value of the G signal (hereafter referred to as the 'maximum G value') is greater than the maximum RB value. A resulting displayed image has the enhanced green tone.

On the assumption of the RGB signal, the greater maximum G value than the maximum RB value gives the higher possibility that the signal format of the video signal is the Y/color difference signal.

The RGB/color difference signal discrimination process of the second embodiment provides information regarding the color difference probability B relative to a G rate (defined below), which is set in such a manner that the greater G rate gives the higher color difference probability B (hereafter referred to as 'information on color difference probability to G rate'). The G rate represents a degree of largeness of the maximum G value to the maximum RB value and is expressed as:

$$G \text{ rate } (\%) = ((\text{Maximum } G \text{ Value} - \text{Maximum } RB \text{ Value})/RGB\text{MAX}) \times 100 \qquad (1)$$

Here RGBMAX represents a maximum possible value of the R, G, and B signal components. In this embodiment, RGBMAX is set equal to 255.

The RGB/color difference signal discrimination process then extracts the maximum RB value and the maximum G value of the input video signal from the video signal-relating information obtained at step S40 in the flowchart of FIG. 2, and calculates the G rate according to Equation (1) given above. The color difference probability B corresponding to the calculated G rate is specified by referring to the information on color difference probability to G rate.

FIG. 11 shows the information on color difference probability to G rate. The color difference probability B set in FIG. 11 varies with a variation in magnitude of the Y signal component, that is, a variation in luminance, in order to ensure accurate discrimination of the Y/color difference signal representing the black and white image shown in FIG. 10.

The G rate calculated according to Equation (1) may have a value of lower than 0%, when the maximum G value is greater than the maximum RB value. In the illustrated example of FIG. 11, the information on color difference probability to G rate shows only the settings of the color difference probability B corresponding to the G rate in the range of 0% to 100%. There is no setting of the color difference probability B corresponding to the G rate of less than 0%. The G rate of lower than 0% is accordingly set equal to 0%.

In the illustrated example of FIG. 11, in the range of the G rate of not lower than 40%, the color difference probability B is set to gradually increase from 0% with an increase in G rate. In the range of the G rate of lower than 40%, the color difference probability B is set to gradually decrease from 0% with a decrease in G rate.

The color difference probability B is set across the G rate of 40% on the boundary. The input video signal of the RGB signal format may represent a green image with a variation of only the G signal component. This video signal generally has the G rate of 30% to 40%. It is difficult to discriminate between the video signal of the RGB signal format representing a green image and the video signal of the Y/color difference signal format representing a black and white image. The process of this embodiment sets the relation between the G rate and the color difference probability B to identify the video signal as the RGB signal when the G rate is lower than 40% and to identify the video signal as the Y/color difference signal when the G rate is not lower than 40%. More specifically the color difference probability B is set to increase with an increase in G rate in the range of not lower than 40% and to decrease with a decrease in G rate in the range of lower than 40%.

B.2 RGB/Color Difference Signal Discrimination Based on Comparison between RGB Probability and Total Color Difference Probability (A+B)

FIG. 12 shows a result of discrimination based on a comparison between the RGB probability and the total color difference probability (A+B) when the video signal is a Y/color difference signal representing a black and white image. As in the example of FIG. 10, in the illustrated example of FIG. 12, the video signal is a Y/color difference signal representing a black and white image with a variation in luminance at six levels, 70%, 60%, 50%, 40%, 30%, and 20%.

The settings of the RGB probability are identical with those in the example of FIG. 10 and are fixed to 0% in any ranges.

The settings of the color difference probability A are also identical with those in the example of FIG. 10 and are fixed to −10% in any ranges.

The G rate sequentially changes as 70%, 60%, 50%, 40%, 30% to 20% with the variation in luminance at the levels of 70%, 60%, 50%, 40%, 30%, and 20%. The color difference probability B is set to 100%, 100%, 50%, 20%, 0%, and −10% in the respective ranges by referring to the information on color difference probability to G rate (see FIG. 9).

The total color difference probability (A+B) is obtained by summing up the color difference probability A and the color difference probability B and is set equal to 90%, 90%, 40%, 10%, −10%, and −20% in the respective ranges.

Comparison between the RGB probability and the total color difference probability (A+B) in any ranges shows that the Y/color difference signal of the black and white image, which is mistakenly identified as the RGB signal in the example of FIG. 10, is accurately identified as the Y/color difference signal at the luminance level of not lower than 40%.

FIG. 13 shows a result of discrimination based on a comparison between the RGB probability and the total color difference probability (A+B) when the video signal is an RGB signal. Like the example of FIG. 8, the illustrated example of FIG. 13 has five variable ranges of the R, G, and B signal components, 0 to 64, 0 to 128, 0 to 153, 0 to 191, and 0 to 255 as 8-bit values.

The settings of the RGB probability are identical with those in the example of FIG. 8 and are respectively 0%, 0%, 30%, 70%, and 100%.

The settings of the color difference probability A are also identical with those in the example of FIG. 8 and are fixed to −10% in any ranges.

The settings of the G rate are fixed to 0% in any ranges, since the maximum values of the R, G, and B signal components are identical with one another. The information on color difference probability to G rate (see FIG. 9) accordingly gives the settings of the color difference probability B fixed to −30% in any ranges.

Summation of the color difference probability A and the color difference probability B gives the total color difference probability (A+B) fixed to −40% in any ranges.

The total color difference probability (A+B) is lower than the color difference probability A in any ranges. Comparison between the RGB probability and the total color difference probability (A+B) accordingly ensures the higher accuracy of the identification as the RGB signal than comparison between the RGB probability and the color difference probability A.

As described above, the RGB/color difference signal discrimination process of the second embodiment compares the RGB probability with the total color difference probability (A+B) to determine whether the signal format of the video signal is the RGB signal or the Y/color difference signal. The RGB probability shows the possibility of the RGB signal, and the total color difference probability (A+B) shows the possibility of the Y/color difference signal. As described previously, the prior art RGB/color difference signal discrimination method compares each video signal with a preset value that is a little lower than the clamp level and discriminates between the RGB signal and the Y/color difference signal, based on the presence or the absence of the signal level lower than the preset value. Compared with this prior art method, the method of this embodiment significantly lowers the potential for wrong discrimination and enhances the accuracy of the discrimination. The procedure of the second embodiment uses the total color difference probability (A+B), which is the sum of the color difference probability A equivalent to the color difference probability of the first embodiment and the color difference probability B calculated from the G rate. This further improves the accuracy of the color difference probability representing the possibility of the Y/color difference signal, thus more effectively lowering the potential for wrong discrimination and enhancing the accuracy of the discrimination.

C. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

(1) In the above embodiments, the video signal identification process is executed at every start of the projector. This is, however, not essential, and the video signal identification process may be executed at diverse timings in operation of the projector. For example, a variation in video signal is detected by monitoring a variation in frequency of the synchronizing signal, and the video signal identification process is triggered by the detected variation in video signal.

(2) The process of the second embodiment sets the color difference probability corresponding to the ratio of the maximum G value to the maximum RB value (the degree of green) to the color difference probability B on the assumption that the signal format of the input video signal is the RGB signal. This setting is, however, not restrictive. One possible modification may set the color difference probability corresponding to the ratio of the minimum Y value to the minimum color difference value (the degree of purple) to the color difference value B on the assumption that the signal format of the input video signal is the Y/color difference signal.

(3) In the embodiments described above, part of the hardware configuration may be replaced by the software configuration, while part of the software configuration may be replaced by the hardware configuration. For example, the series of processing executed by the video signal identification module 410 shown in FIG. 1 may be actualized by a hardware circuit structure.

(4) In the embodiments described above, the liquid crystal panel called the light valve is applied to the light modulation device. This structure is, however, not restrictive at all. The technique of the invention is also applicable to projectors, for example, including digital micro-mirror devices (DMD).

(5) The above embodiments regard the projector. The technique of the invention is also applicable to direct-view video display devices like liquid-crystal displays (LCD) and plasma displays (PDP). The invention is not restricted to the video display devices but is applicable to diversity of image processing devices that process video signals, for example, scan converters.

All changes within the meaning and range of equivalency of the claims are intended to be embraced therein. The scope and spirit of the present invention are indicated by the appended claims, rather than by the foregoing description.

What is claimed is:

1. A video signal identification device that determines whether a signal format of an input video signal is an RGB signal or a Y/color difference signal, the video signal identification device comprising:
   a clamp circuit that clamps the input video signal to adjust a pedestal level of the input video signal to a predetermined signal level and outputs the clamped video signal;
   an AD conversion circuit that receives the video signal output from the clamp circuit;
   a video signal-relating information acquisition module that acquires a preset piece of video signal-relating information, in response to an output video signal from the AD conversion circuit; and
   a video signal identification module that obtains an RGB probability, which represents a possibility that the signal format of the input video signal is the RGB signal, and a color difference probability, which represents a possibility that the signal format of the input video signal is the Y/color difference signal, based on the preset piece of video signal-relating information acquired by the video signal-relating information acquisition module, and compares the RGB probability with the color difference probability to determine whether the signal format of the input video signal is the RGB signal or the Y/color difference signal,
   wherein the video signal identification module sets the predetermined signal level in the clamp circuit to a substantially minimum level in a dynamic range of the AD conversion circuit on the assumption that the signal format of the input video signal is the RGB signal, causes the video signal-relating information acquisition module to acquire a maximum RB value, which is a largest value of an R signal component and a B signal component output from the AD conversion circuit, as the preset piece of video signal-relating information, and obtains the RGB probability corresponding to a degree of largeness of the acquired maximum RB value,
   the video signal identification module setting the predetermined signal level of a color difference signal component in the clamp circuit to a substantially center level in the dynamic range of the AD conversion circuit on the assumption that the signal format of the input video signal is the Y/color difference signal, causing the video signal-relating information acquisition module to acquire a minimum color difference value, which is a smallest value of the color difference signal component output from the AD conversion circuit, as the preset piece of video signal-relating information, and obtaining the color difference probability corresponding to a degree of smallness of the acquired minimum color difference value.

2. A video signal processing device that carries out a series of video signal processing corresponding to a type of an input video signal, the video signal processing device comprising:
   a video signal identification device in accordance with claim 1;
   a processing control module that controls the series of video signal processing to be executed under an operating condition corresponding to a result of determination executed by the video signal identification module.

3. A video display device that carries out a series of video signal processing corresponding to a type of an input video signal and displaying a video image expressed by the input video signal, the video display device comprising:
   a video signal processing device in accordance with claim 2; and
   a display module that displays a video image corresponding to a processed video signal output from the video signal processing device.

4. A video signal identification device that determines whether a signal format of an input video signal is an RGB signal or a Y/color difference signal, the video signal identification device comprising:
   a clamp circuit that clamps the input video signal to adjust a pedestal level of the input video signal to a predetermined signal level and outputs the clamped video signal;
   an AD conversion circuit that receives the video signal output from the clamp circuit;
   a video signal-relating information acquisition module that acquires a preset piece of video signal-relating information, in response to an output video signal from the AD conversion circuit; and
   a video signal identification module that obtains an RGB probability, which represents a possibility that the signal format of the input video signal is the RGB signal, and a color difference probability, which represents a possibility that the signal format of the input video signal is the Y/color difference signal, based on the preset piece of video signal-relating information acquired by the video signal-relating information acquisition module, and compares the RGB probability with the color difference probability to determine whether the signal format of the input video signal is the RGB signal or the Y/color difference signal,
   wherein the video signal identification module sets the predetermined signal level in the clamp circuit to a substantially minimum level in a dynamic range of the AD conversion circuit on the assumption that the signal format of the input video signal is the RGB signal, causes the video signal-relating information acquisition module to acquire a maximum RB value, which is a largest value of an R signal component and a B signal component output from the AD conversion circuit, as the preset piece of video signal-relating information, and obtains the RGB probability corresponding to a degree of largeness of the acquired maximum RB value, the video signal identification module setting the predetermined signal level of a color difference signal component in the clamp circuit to a substantially center level in the dynamic range of the AD conversion circuit on the assumption that the signal format of the input video signal is the Y/color difference signal, causing the video signal-relating information acquisition module to acquire a minimum color difference value, which is a smallest value of the color difference signal component output from the AD conversion circuit, as the preset piece of video signal-relating information, and obtaining a first color difference probability corresponding to a degree of smallness of the acquired minimum color difference value, the video signal identification module causing the video signal-relating information acquisition module to acquire the maximum RB value and a maximum G value, which is a largest value of a G signal component, as the preset piece of video signal-relating information, and obtaining a second color difference probability corresponding to a degree of largeness of the maximum G value to the maximum RB value, the video signal identification module summing up the first color difference probability and the second color difference probability to a total color difference probability, which is to be compared with the RGB probability.

5. A video signal processing device that carries out a series of video signal processing corresponding to a type of an input video signal, the video signal processing device comprising:
- a video signal identification device in accordance with claim 4;
- a processing control module that controls the series of video signal processing to be executed under an operating condition corresponding to a result of determination executed by the video signal identification module.

6. A video display device that carries out a series of video signal processing corresponding to a type of an input video signal and displaying a video image expressed by the input video signal, the video display device comprising:
- a video signal processing device in accordance with claim 5; and
- a display module that displays a video image corresponding to a processed video signal output from the video signal processing device.

7. A video signal identification device that determines whether a signal format of an input video signal is an RGB signal or a Y/color difference signal, the video signal identification device comprising:
- a clamp circuit that clamps the input video signal to adjust a pedestal level of the input video signal to a predetermined signal level and outputs the clamped video signal;
- an AD conversion circuit that receives the video signal output from the clamp circuit;
- a video signal-relating information acquisition module that acquires a preset piece of video signal-relating information, in response to an output video signal from the AD conversion circuit; and
- a video signal identification module that obtains an RGB probability, which represents a possibility that the signal format of the input video signal is the RGB signal, and a color difference probability, which represents a possibility that the signal format of the input video signal is the Y/color difference signal, based on the preset piece of video signal-relating information acquired by the video signal-relating information acquisition module, and compares the RGB probability with the color difference probability to determine whether the signal format of the input video signal is the RGB signal or the Y/color difference signal, wherein the video signal identification module sets the predetermined signal level in the clamp circuit to a substantially minimum level in a dynamic range of the AD conversion circuit on the assumption that the signal format of the input video signal is the RGB signal, causes the video signal-relating information acquisition module to acquire a maximum RB value, which is a largest value of an R signal component and a B signal component output from the AD conversion circuit, as the preset piece of video signal-relating information, and obtains the RGB probability corresponding to a degree of largeness of the acquired maximum RB value, the video signal identification module setting the predetermined signal level of a color difference signal component in the clamp circuit to a substantially center level in the dynamic range of the AD conversion circuit on the assumption that the signal format of the input video signal is the Y/color difference signal, causing the video signal-relating information acquisition module to acquire a minimum color difference value, which is a smallest value of the color difference signal component output from the AD conversion circuit, as the preset piece of video signal-relating information, and obtaining a first color difference probability corresponding to a degree of smallness of the acquired minimum color difference value, the video signal identification module causing the video signal-relating information acquisition module to acquire the minimum color difference value, and to acquire a minimum Y value, which is a smallest value of the Y signal component, as the preset piece of video signal-relating information by setting the predetermined signal level of a Y signal component to the substantially minimum level in the dynamic range of the AD conversion circuit, and obtaining a second color difference probability corresponding to a degree of smallness of the minimum Y value to the minimum color difference value, the video signal identification module summing up the first color difference probability and the second color difference probability to a total color difference probability, which is to be compared with the RGB probability.

8. A video signal processing device that carries out a series of video signal processing corresponding to a type of an input video signal, the video signal processing device comprising:
- a video signal identification device in accordance with claim 7;
- a processing control module that controls the series of video signal processing to be executed under an operating condition corresponding to a result of determination executed by the video signal identification module.

9. A video display device that carries out a series of video signal processing corresponding to a type of an input video signal and displaying a video image expressed by the input video signal, the video display device comprising:
   a video signal processing device in accordance with claim 8; and
   a display module that displays a video image corresponding to a processed video signal output from the video signal processing device.

10. A video signal identification method that determines whether a signal format of an input video signal is an RGB signal or a Y/color difference signal, the video signal identification method comprising the steps of:
   acquiring a preset piece of video signal-relating information, in response to a video signal that is clamped to adjust a pedestal level of the input video signal to a predetermined signal level and is subjected to AD conversion; and
   obtaining an RGB probability, which represents a possibility that the signal format of the input video signal is the RGB signal, and a color difference probability, which represents a possibility that the signal format of the input video signal is the Y/color difference signal, based on the preset piece of video signal-relating information, and comparing the RGB probability with the color difference probability to determine whether the signal format of the input video signal is the RGB signal or the Y/color difference signal,
   setting the predetermined signal level to a substantially minimum level in a dynamic range of the AD conversion on the assumption that the signal format of the input video signal is the RGB signal, acquiring a maximum RB value, which is a largest value of an R signal component and a B signal component of the AD-converted video signal, as the preset piece of video signal-relating information, and obtaining the RGB probability corresponding to a degree of largeness of the acquired maximum RB value; and
   setting the predetermined signal level of a color difference signal component to a substantially center level in the dynamic range of the AD conversion on the assumption that the signal format of the input video signal is the Y/color difference signal, acquiring a minimum color difference value, which is a smallest value of the color difference signal component of the AD-converted video signal, as the preset piece of video signal-relating information, and obtaining the color difference probability corresponding to a degree of smallness of the acquired minimum color difference value.

11. A video signal identification method that determines whether a signal format of an input video signal is an RGB signal or a Y/color difference signal, the video signal identification method comprising the steps of:
   acquiring a preset piece of video signal-relating information, in response to a video signal that is clamped to adjust a pedestal level of the input video signal to a predetermined signal level and is subjected to AD conversion; and
   obtaining an RGB probability, which represents a possibility that the signal format of the input video signal is the RGB signal, and a color difference probability, which represents a possibility that the signal format of the input video signal is the Y/color difference signal, based on the preset piece of video signal-relating information, and comparing the RGB probability with the color difference probability to determine whether the signal format of the input video signal is the RGB signal or the Y/color difference signal,
   setting the predetermined signal level to a substantially minimum level in a dynamic range of the AD conversion on the assumption that the signal format of the input video signal is the RGB signal, acquiring a maximum RB value, which is a largest value of an R signal component and a B signal component of the AD-converted video signal, as the preset piece of video signal-relating information, and obtaining the RGB probability corresponding to a degree of largeness of the acquired maximum RB value;
   setting the predetermined signal level of a color difference signal component to a substantially center level in the dynamic range of the AD conversion on the assumption that the signal format of the input video signal is the Y/color difference signal, acquiring a minimum color difference value, which is a smallest value of the color difference signal component of the AD-converted video signal, as the preset piece of video signal-relating information, and obtaining a first color difference probability corresponding to a degree of smallness of the acquired minimum color difference value;
   acquiring the maximum RB value and a maximum G value, which is a largest value of a G signal component, as the preset piece of video signal-relating information, and obtaining a second color difference probability corresponding to a degree of largeness of the maximum G value to the maximum RB value; and
   summing up the first color difference probability and the second color difference probability to a total color difference probability, which is to be compared with the RGB probability.

12. A video signal identification method that determines whether a signal format of an input video signal is an RGB signal or a Y/color difference signal, the video signal identification method comprising the steps of:
   acquiring a preset piece of video signal-relating information, in response to a video signal that is clamped to adjust a pedestal level of the input video signal to a predetermined signal level and is subjected to AD conversion; and
   obtaining an RGB probability, which represents a possibility that the signal format of the input video signal is the RGB signal, and a color difference probability, which represents a possibility that the signal format of the input video signal is the Y/color difference signal, based on the preset piece of video signal-relating information, and comparing the RGB probability with the color difference probability to determine whether the signal format of the input video signal is the RGB signal or the Y/color difference signal,
   setting the predetermined signal level to a substantially minimum level in a dynamic range of the AD conversion on the assumption that the signal format of the input video signal is the RGB signal, acquiring a maximum RB value, which is a largest value of an R signal component and a B signal component of the AD-converted video signal, as the preset piece of video signal-relating information, and obtaining the RGB probability corresponding to a degree of largeness of the acquired maximum RB value;
   setting the predetermined signal level of a color difference signal component to a substantially center level in the dynamic range of the AD conversion on the assumption that the signal format of the input video signal is the Y/color difference signal, acquiring a minimum color difference value, which is a smallest value of the color difference signal component of the AD-converted video signal, as the preset piece of video signal-relating information, and obtaining a first color difference probability corresponding to a degree of smallness of the acquired minimum color difference value;

acquiring the minimum color difference value, setting the predetermined signal level of a Y signal component to the substantially minimum level in the dynamic range of the AD conversion to acquire a minimum Y value, which is a smallest value of the Y signal component, as the preset piece of video signal-relating information, and obtaining a second color difference probability corresponding to a degree of smallness of the minimum Y value to the minimum color difference value, and summing up the first color difference probability and the second color difference probability to a total color difference probability, which is to be compared with the RGB probability.

* * * * *